2,697,094
Patented Dec. 14, 1954

2,697,094

FUNGICIDAL PRODUCTS OF CELLULOSE ETHERS

Friedrich Becke, Bad Duerkheim, and Oskar Flieg, Limburgerhof (Pfalz), Germany, assignors to Badische Anilin- & Soda-Fabrik Aktiengesellschaft, Ludwigshafen am Rhine, Germany No Drawing. Application November 7, 1951,
Serial No. 255,327

Claims priority, application Germany
November 14, 1950

5 Claims. (Cl. 260—231)

This invention relates to new and very active fungicidal products.

According to this invention very active fungicidal products are obtained by reacting 1.2.4-trichloro-3.5-dinitrobenzene with polyhydroxy compounds of high molecular weight or their ethers.

1.2.4-trichloro-3.5-dinitrobenzene is readily obtainable by nitration of 1.2.4-trichlorobenzene which in turn is formed by splitting off hydrogen chloride from hexachlorocyclohexanes.

Suitable high molecular polyhydroxy compounds are for example polysaccharides, such as cellulose, and their methyl, hydroxyethyl or glycollic acid ethers, the so-called "wood ether carboxylic acids" (i. e. reaction products of wood with chloracetic acid), starch, pectic substances, inuline or polyvinyl alcohol.

The reaction takes place by mixing or kneading the reactants, if desired in the presence of solvents or diluents such as water or alcohols, as for example methanol. The co-employment of acid-binding agents, such as caustic alkali, is necessary in order to combine with the hydrogen chloride formed.

Cellulose, for example, is preferably employed in the form of alkali cellulose, and the ethers containing carboxylic groups are preferably employed in the form of their alkali salts.

When employing 1 mol of 1.2.4-trichloro-3.5-dinitrobenzene for each unit of saccharide, the reaction usually proceeds to completion at room temperature in the course of several hours; sometimes heating to about 200° C. is necessary. Amounts which are more or less than the stoichiometrical proportions may also be used.

The reaction products obtained are readily dispersable in water and, even in a state of great dilution, have a considerably greater fungicidal action than 1.2.4-trichloro-3.5-dinitrobenzene itself, without causing injury to leaves.

The fact that the combination of the weakly fungicidal 1.2.4-trichloro-3.5-dinitrobenzene with high molecular polyhydroxy compounds produces so extraordinary an increase in the fungicidal action is surprising; the similarly weak fungicidal action of mononitro-1.2.4-trichlorobenzene, on the contrary, is reduced by combination with high molecular polyhydroxy compounds.

The following examples will further illustrate this invention but the invention is not limited to these examples. The parts are by weight.

Example 1

240 parts of "wood ether carboxylic acids," prepared as described in British patent specification No. 508,547, are thoroughly mixed for 2 hours at room temperature in a kneader with a solution of 40 parts of caustic soda in 40 parts of water. 272 parts of finely powdered 1.2.4-trichloro-3.5-dinitrobenzene are then gradually added and the whole kneaded for a further 4 hours.

The product obtained completely prevents the growth of *Aspergillus niger* cultures on agar-agar in a dilution of 1:30,000; in a dilution of 1:100,000 a marked arrestment of growth is observed.

Example 2

100 parts of alkali cellulose are introduced at room temperature while stirring into a solution of 100 parts of 1.2.4-trichloro-3.5-dinitrobenzene in 350 parts of methanol. The mixture is then heated to about 100° C. until the methanol has been evaporated. The residue is finely ground in a ball mill.

The product obtained shows a similar action to that obtained according to Example 1.

Example 3

110 parts of the "wood ether carboxylic acids" specified in Example 1 are worked in a kneader at room temperature with 10 parts of water and 55 parts of 1.2.4-trichloro-3.5-dinitrobenzene. The product obtained after kneading for half an hour is comminuted by grinding for 3 hours in a ball mill.

The product has a similar action to that obtainable according to Example 1.

What we claim is:

1. A process for the production of fungicidal cellulose ethers which consists in etherifying a member of the group consisting of sodium cellulose and sodium salts of cellulose glycollic acid ethers with 1,2,4-trichloro-3,5-dinitrobenzene whereby 2,6-dinitro-4,5-dichlorophenyl ethers of the cellulosic material and sodium chloride are obtained.

2. A process for the production of 2,6-dinitro-4,5-dichlorophenyl ethers of cellulose which consists in heating sodium cellulose with about equivalent amounts, with reference to the sodium present in the sodium cellulose, of 1,2,4-trichloro-3,5-dinitrobenzene at about 100° C. in the presence of methanol.

3. A process for the production of mixed 2,6-dinitro-4,5-dichlorophenyl and glycollic acid ethers of cellulose which consists in kneading sodium salts of cellulose glycollic acid ethers prepared by treating finely ground wood with chloroacetic acid and excess caustic soda with about equivalent amounts, with reference to the sodium still present in said sodium salts of cellulose glycollic acid ethers, of 1,2,4-trichloro-3,5-dinitrobenzene at ordinary temperature.

4. 2,6-dinitro-4,5-dichlorophenyl ethers of cellulose.

5. Mixed 2,6-dinitro-4,5-dichlorophenyl and glycollic acid ethers of cellulose.

References Cited in the file of this patent

UNITED STATES PATENTS

| Number | Name | Date |
|---|---|---|
| 2,547,261 | Geiger et al. | Apr. 3, 1951 |
| 2,559,986 | Musser | July 10, 1951 |

FOREIGN PATENTS

| Number | Country | Date |
|---|---|---|
| 10,678 | Great Britain | 1904 |
| 225,262 | Great Britain | Dec. 2, 1924 |
| 508,547 | Great Britain | June 30, 1939 |